(12) United States Patent
Liu et al.

(10) Patent No.: US 9,370,734 B2
(45) Date of Patent: Jun. 21, 2016

(54) FLUID DEGASSING MODULE WITH HELICAL MEMBRANE

(71) Applicant: IDEX Health & Science LLC, Rohnert Park, CA (US)

(72) Inventors: Quan Liu, Petaluma, CA (US); Carl Sims, Santa Rosa, CA (US); Yuri Gerner, Mendota Heights, MN (US)

(73) Assignee: IDEX Health & Science, LLC, Rohnert Park, CA (US)

( * ) Notice: Subject to any disclaimer, the term of this patent is extended or adjusted under 35 U.S.C. 154(b) by 61 days.

(21) Appl. No.: 14/303,778

(22) Filed: Jun. 13, 2014

(65) Prior Publication Data

US 2015/0000520 A1 Jan. 1, 2015

Related U.S. Application Data

(60) Provisional application No. 61/839,746, filed on Jun. 26, 2013.

(51) Int. Cl.
*B01D 19/00* (2006.01)

(52) U.S. Cl.
CPC ............ *B01D 19/00* (2013.01); *B01D 19/0031* (2013.01)

(58) Field of Classification Search
CPC ..... B01D 19/0031; B01D 63/02; B01D 63/06
USPC .................................................. 96/6; 95/46
See application file for complete search history.

(56) References Cited

U.S. PATENT DOCUMENTS

| | | |
|---|---|---|
| 3,339,341 A | 9/1967 | Donald |
| 3,422,008 A | 1/1969 | McClain |
| 3,751,879 A | 8/1973 | Allington |
| 4,325,715 A | 4/1982 | Bowman et al. |
| 4,351,092 A | 9/1982 | Sebring |
| 5,340,384 A * | 8/1994 | Sims ................ B01D 19/0031 96/10 |
| 5,425,803 A * | 6/1995 | van Schravendijk ..... B01D 19/0031 95/46 |
| 5,773,713 A | 6/1998 | Barber et al. |
| 5,980,742 A | 11/1999 | Saitoh |
| 6,248,157 B1 | 6/2001 | Sims |
| 6,461,407 B2 | 10/2002 | Takamatsu et al. |
| 6,494,938 B2 | 12/2002 | Sims et al. |
| 2002/0195385 A1 * | 12/2002 | Cho ................ B01D 19/0031 210/321.83 |

(Continued)

FOREIGN PATENT DOCUMENTS

GB 1536681 12/1987

OTHER PUBLICATIONS

European search report and search opinion issued in related European application serial No. 14174080.3, 2015.

*Primary Examiner* — Jason M Greene
(74) *Attorney, Agent, or Firm* — Haugen Law Firm PLLP

(57) ABSTRACT

A degassing module is adapted for degassing a liquidous fluid at relatively high throughput flow rates. The degassing module includes a tubular separation membrane that is helically wound within an interior chamber of a degassing module housing. The helically wound tubular separation membrane is disposed in an axial flow gap of predetermined proportions that maximizes fluid flow dynamics in reducing the gas transport resistance from the liquid phase across the membrane. Typically, the helically wound tubular separation membrane is positioned in the gap with radial spacings to surfaces bounding the gap, thereby forming axial flow channels circumaxially inwardly and/or outwardly of the wound tubular membrane.

20 Claims, 14 Drawing Sheets

(56) References Cited

U.S. PATENT DOCUMENTS

| | | | | |
|---|---|---|---|---|
| 2004/0050786 A1* | 3/2004 | Dey | ................... | B01D 19/0031 210/640 |
| 2006/0037911 A1 | 2/2006 | Dasgupta | | |
| 2007/0012190 A1 | 1/2007 | Gerner | | |
| 2009/0301306 A1* | 12/2009 | Ooya | ................. | B01D 19/0031 96/6 |
| 2011/0036240 A1* | 2/2011 | Taylor | ................ | B01D 19/0031 96/6 |

* cited by examiner

FLUID DEGASSING MODULE WITH HELICAL MEMBRANE

CROSS-REFERENCE TO RELATED APPLICATIONS

This application claims priority to U.S. Provisional Patent Application Ser. No. 61/839,746, filed on Jun. 26, 2013 and entitled "Fluid Degassing Module with Helical Membrane," the content of which being incorporated herein in its entirety.

FIELD OF THE INVENTION

The present invention relates to fluid degassing systems generally, and more particularly to apparatus for removing gasses from a liquid in a relatively high flow rate regime.

BACKGROUND OF THE INVENTION

The removal of entrained gasses from liquids is an important exercise in a variety of manufacturing and/or analytical processes. An example process in which liquid degassing is widely utilized is in liquid chromatography applications. The presence of dissolved gasses can be undesirable in such applications, wherein the presence of dissolved gasses interferes with the functionality or accuracy of the application.

In the case of liquid chromatography, for example, dissolved gasses in the chromatographic mobile phase can manifest itself in the form of bubbles, which can cause noise and drift in the chromatographic detector. Moreover, the existence of gas bubbles can cause erroneous absorption signatures at the detector.

As chromatographic analyses diversify, applications with relatively high fluid flow rates (>20 ml/min) are becoming more common, especially for separating and purifying compounds from a mixed solution after a synthesis or from natural extracts. Such flow rate in liquid chromatography is known as "preparative scale" liquid chromatography, and normally involves mobile phase (solvent) flow of at least 20 ml/min, and may, in some cases, be between 100-250 ml/min. Analytical scale liquid chromatography, by contrast, typically involves mobile phase flow rates of 0.1-10 ml/min. A variety of degassing solutions are in place for analytical scale HPLC, with the most common utilizing semi-permeable (liquid-impermeable, gas-permeable) tubing in a flow-through arrangement, wherein the solvent mobile phase is driven through the lumen of the tubing within an environment conducive to the removal of gaseous species from the liquid solvent through the tubing wall. Such degassing systems are described in, for example, U.S. Pat. Nos. 3,751,879; 5,340,384; 5,980,742; 6,248,157; and 6,494,938, the contents of which being incorporated herein by reference.

The arrangements described and employed in conventional degassing systems, however, are inadequate to suitably degas the solvent flow rates utilized in preparative scale liquid chromatography. One approach to degassing in high solvent flow rate regimes is to use a plurality of tubular membranes as a hollow fiber bundle in a degassing module, wherein, in some cases, more than 100 hollow fiber separation membranes may be bundled together. Example hollow fiber degassing bundle arrangements are described in U.S. Pat. Nos. 3,339,341; 3,422,008; and 4,351,092. Typically, however, manufacturing of such hollow fiber degassing modules is difficult, particularly in potting the fibers within the housing when the fibers are fabricated from low surface energy materials such as PTFE or Teflon™ AF (which are desired for their membrane properties).

Another approach to liquid degassing in high flow rate regimes is the use of a flat membrane in a degassing module. However, manufacturing such flat degassing membrane modules has proven difficult, both to seal the flat membrane within the module, as well as to manufacture a pin-hole free, uniform flat film.

It is therefore an object of the present invention to provide a degassing module that is both effective in degassing fluids at high flow rates, and is capable of being economically and reproducibly manufactured.

SUMMARY OF THE INVENTION

By means of the present invention, relatively high flow rate liquidous fluids may be economically degassed. A degassing module for performing the liquid degassing includes a tubular separation membrane that is helically wound within an interior chamber of a degassing module housing. The wound tubular membrane may be helically positioned in an axial gap between opposed surfaces, with a predetermined spacing between the membrane and one or more of the opposed surfaces.

In one embodiment, a degassing module of the present invention includes a housing defining an interior chamber and a housing axis, with the housing having an evacuation port opening to the chamber, and a fluid inlet port and a fluid outlet port each opening to the chamber for permitting flow of the fluid through the interior chamber. The degassing module further includes a cell secured to the housing and having a length extending axially along the housing axis in the interior chamber. A tubular separation membrane is helically wound about the cell in a gap between an inner surface of the housing and an outer surface of the cell. The membrane defines a lumen that is in fluid communication with the evacuation port for evacuating the lumen. The membrane forms a gas-permeable, liquid-impermeable barrier between the interior chamber and the lumen. The degassing module further includes a housing strut extending from the inner surface of the housing to maintain the membrane in a spaced relationship from the inner surface of the housing, with a first spacing being defined radially between the membrane and the inner surface of the housing. A cell strut extends from the outer surface of the cell to maintain the membrane in a spaced relationship from the outer surface of the cell, with a second spacing being defined radially between the membrane and the outer surface of the cell.

In another embodiment, a degassing module of the present invention includes a housing defining an interior chamber and a housing axis, and having an evacuation port, a fluid inlet port, and a fluid outlet port. The degassing module further includes a cell secured into the interior chamber and extending axially along the housing axis to form a circumaxial gap in the interior chamber and radially bounded by a first surface and a second surface that is substantially parallel to the first surface. A tubular separation membrane defines a lumen that is in fluid communication with the evacuation port for evacuating the lumen. The membrane forms a gas-permeable, liquid-impermeable barrier between the interior chamber and the lumen. The membrane is helically wound about the cell in the circumaxial gap, and is supported to maintain a first spacing between the membrane and the first surface, and a second spacing between the membrane and the second surface. The first and second spacings are preferably between 50-500 micrometers.

A degassing system of the present invention includes a liquidous fluid source and a degassing module having a housing defining an interior chamber and a housing axis, with an evacuation port, a fluid inlet port, and a fluid outlet port. The degassing module further includes a cell secured in the interior chamber and extending axially along the axis to form a circumaxial gap in the interior chamber and radially bounded by the housing and the cell. A tubular separation membrane defines a lumen that is in fluid communication with the evacuation port for evacuating the lumen. The membrane forms a gas-permeable, liquid-impermeable barrier between the interior chamber and the lumen. The membrane is helically wound about the cell in the circumaxial gap, and is supported to maintain a first spacing between the membrane and an inner surface of the housing, and a second spacing between the membrane and an outer surface of the cell. The degassing system further includes a transfer conduit that fluidically couples the liquidous fluid source to the fluid inlet, and a pump for motivating the liquidous fluid from the liquidous fluid source through the interior chamber of the degassing module. A vacuum source is provided in the degassing system for evacuating the lumen through the evacuation port.

A method for degassing a liquidous fluid includes providing a degassing module having a housing defining an interior chamber and a housing axis, with an evacuation port, a fluid inlet port, and a fluid outlet port. The degassing module further includes a cell secured in the interior chamber and extending axially along the housing axis to form a circumaxial gap in the interior chamber and radially bounded by the housing and the cell. A tubular separation membrane defines a lumen that is in fluid communication with the evacuation port for evacuating the lumen. The membrane forms a gas-permeable, liquid-impermeable barrier between the interior chamber and the lumen. The membrane is helically would about the cell in the circumaxial gap, and is supported to maintain a first spacing between the membrane and the first surface, and a second spacing between the membrane and the second surface. The degassing method further includes motivating the liquidous fluid through the fluid inlet and into contact with the membrane in the interior chamber, and evacuating the lumen through the evacuation port. The liquidous fluid is then delivered from the interior chamber through the outlet port.

DETAILED DESCRIPTION OF THE PREFERRED EMBODIMENTS

A degassing module 10 of the present invention may be incorporated in, for example, a liquid chromatography apparatus for degassing the mobile phase being analyzed in the chromatographic column. Degassing module 10 may be employed, however, in a variety of other liquid supply applications that rely upon degassed liquids in order to achieve and preserve consistent and high quality results. Other example applications include, for example, ink delivery systems such as in ink-jet printers, semiconductor wafer manufacturing processes, and pharmaceutical manufacturing.

An embodiment of degassing module 10 includes a housing 12 defining an interior chamber 14 wherein the fluid to be degassed may be contacted by a semi-permeable separation membrane 16. In preferred embodiments, separation membrane 16 may be in the form of one or more lengths of tubing to form a gas-permeable, liquid-impermeable barrier between interior chamber 14 and a lumen of the respective tubular separation membrane 16. One example of such a membrane is a non-porous fluorinated copolymer, such as a membrane formed from Teflon™ AF, available from DuPont. The separation membrane may be qualified for a specific application as having known permeation rates for certain gaseous species, as well as known selectivity values. Alternative separation membrane materials include microporous materials manufactured from PTFE, ePTFE, PVDF, polypropylene, polymethylpentene, and surface fluorinated versions of polypropylene and polymethylpentene. It is to be understood, however, that tubular separation membrane 16 may be fabricated from a variety of materials to accomplish the gas-permeable, liquid-impermeable barrier utilized in degassing applications.

Figure 1:
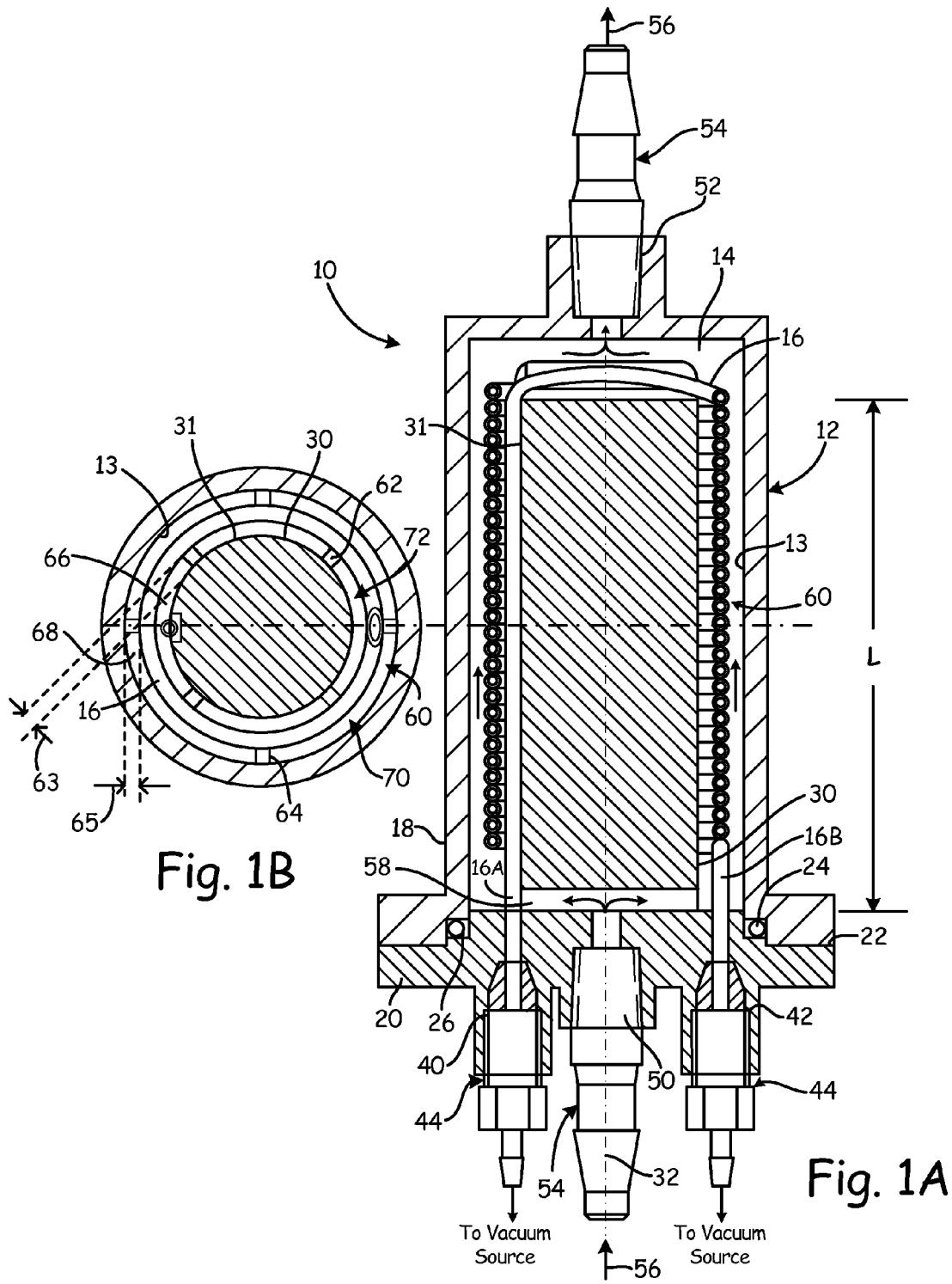
FIG. 1A is a cross-sectional schematic view of a fluid degassing module of the present invention.
FIG. 1B is a cross-sectional view of the fluid degassing module of FIG. 1A.
Figure 2:
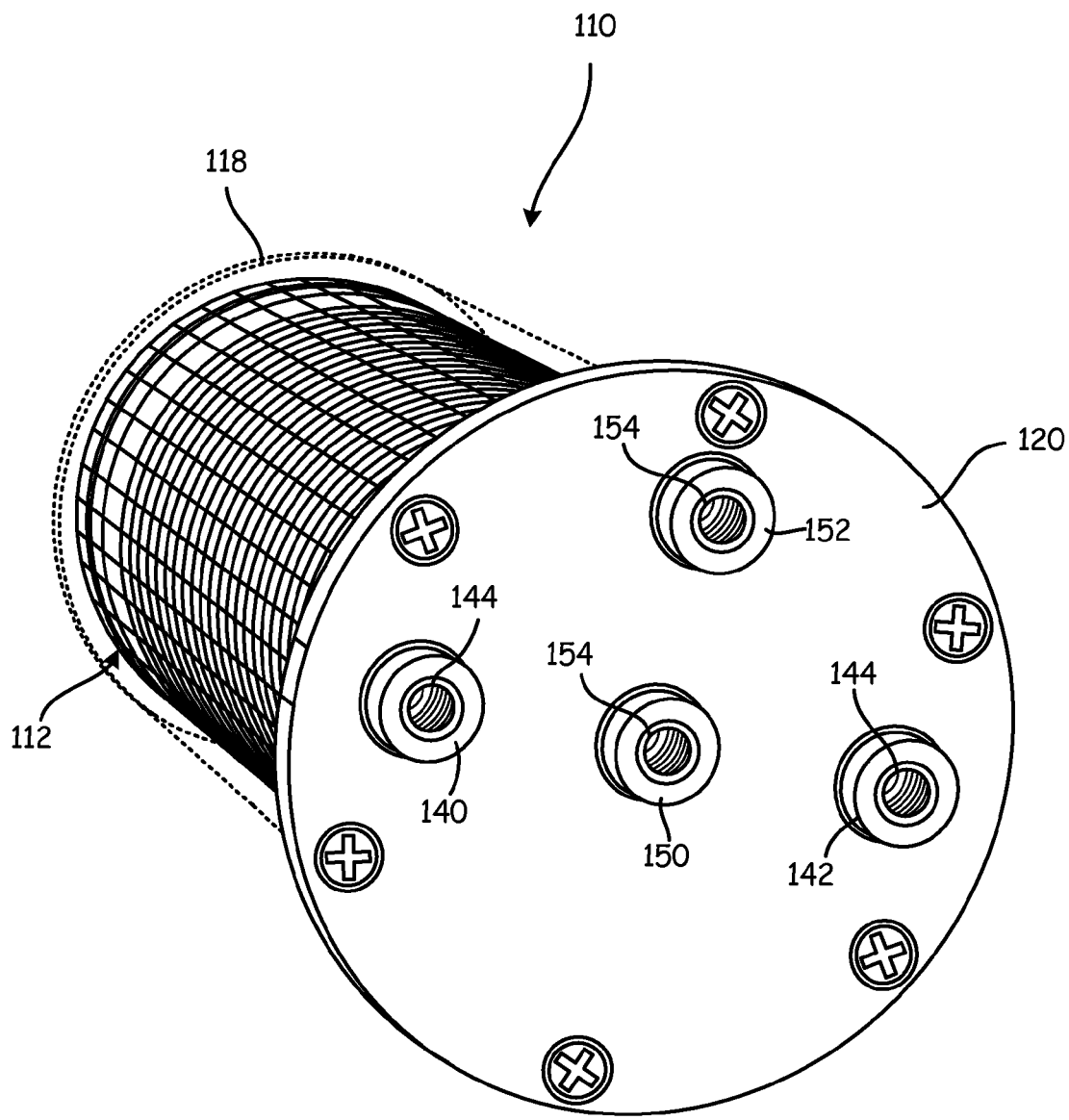
FIG. 2 is a perspective view of a fluid degassing module of the present invention.
Figure 3:
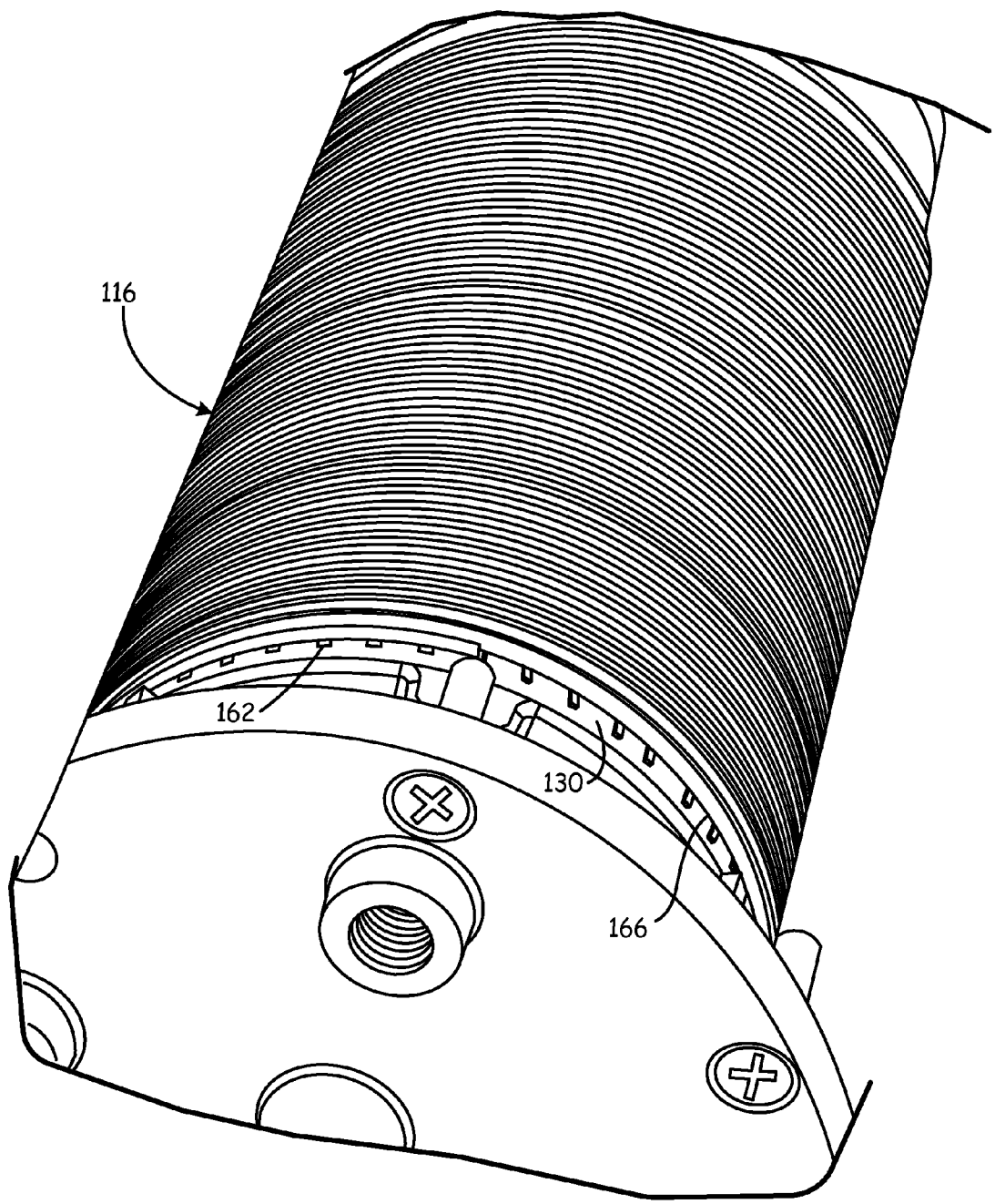
FIG. 3 is a schematic perspective view of a portion of the fluid degassing module of FIG. 2.

Housing 12 may be formed as a single piece, or multiple-piece body, with the embodiment illustrated in FIG. 1A including a housing shell 18 and a housing cap 20 that is sealingly engaged to housing shell 18 at cap interface 22. To enhance the sealing engagement between housing cap 20 and housing shell 18, a gasket 24, such as a rubber O-ring, may be provided in a gasket seat 26 of housing cap 20 to sealingly press between housing cap 20 and housing shell 18. Housing 12 may preferably be fabricated from one or more relatively strong and inert materials to avoid undesired interactions with mobile phase flow through interior chamber 14. Example housings 12 may be fabricated from stainless steel or other metals or metal alloys, or various polymer materials.

A cell 30 may be disposed in interior chamber 14 as a body about which tubular separation membrane 16 may be wound and/or through which fluid may be distributed into and/or out from interior chamber 14. Cell 30 may be anchored to housing 12 for desired positioning within interior chamber 14. In some embodiments, cell 30 may be integrally formed with, or secured to housing cap 20, with this arrangement being illustrated in FIG. 1A. Typically, cell 30 may be arranged axially within interior chamber 14 along a housing axis 32.

In the embodiment illustrated in FIGS. 1A and 1B, housing 12 includes a first evacuation port 40 and a second evacuation port 42 for receiving respective vacuum couplings 44 that fluidly couple a respective lumen of separation membrane tube 16 to a vacuum source for evacuating the lumen of separation membrane tube 16. In operation, therefore, separation membrane tube 16 may be evacuated to a predetermined extent to generate a driving force for gas to diffuse through the tubular wall of separation membrane 16 from the fluid in interior chamber 14. Gaseous species that diffuse through the wall of tubular separation membrane 16 may be removed through a respective first and second evacuation port 40, 42. The concept of "vacuum degassing" is well-known in the art, though not typically employed as described above with an evacuation of the lumen of tubular separation membrane 16 and with the gas-containing liquid contacting the outer surface of the membrane wall defined by tubular separation membrane 16. Such arrangement may be referred to as "outside-in" vacuum degassing.

The diffused gas may also or instead be evacuated from the lumen of tubular separation membrane 16 with a sweep gas. In a particular embodiment, an air bleed may be provided at port 42 so that environmental air is drawn through the lumen to sweep diffused gas through evacuation port 40 and to prevent condensation within the lumen of the tubular separation membrane 16.

Housing 12 further includes a fluid inlet port 50 and a fluid outlet port 52 for receiving respective fluid coupling units 54 for communicating fluid into and out from interior chamber 14. For the purposes hereof, the term "fluid" may include a gas-containing liquid, wherein a concentration of the one or more gaseous species is desired to be maintained below a threshold. The one or more gaseous species may be partially or completely removed from the liquidous fluid through operable contact with tubular separation membrane 16 when the environment in the lumen of separation membrane 16 has a partial pressure(s) of the gaseous species that is less than the partial pressure(s) of the target gaseous species in the liquidous fluid. In some embodiments, such an environment may be achieved by evacuating the lumen to a predetermined extent, in accordance with the well-understood principles of vacuum degassing. In one embodiment, liquidous fluid enters interior chamber 14 through fluid inlet port 50 along direction arrow 56, and through distribution channel 58 in cell 30. The flow of fluid between fluid inlet port 50 and fluid outlet port 52 results in fluid contact with separation membrane 16 along length "L" of cell 30. As will be described in greater detail hereinbelow, the arrangement of separation membrane 16 between cell 30 and housing 12 facilitates an enhanced degassing efficiency, to an extent that liquidous fluid flow rates exceeding 20 ml/min through fluid inlet port 50 may be sufficiently degassed by the time it exits interior chamber 14 at fluid outlet port 52.

Separation membrane tubing 16A, 16B may be helically wound about cell 30, in a space between cell 30 and housing 12. Preferably, separation membrane 16 may be disposed between an outer surface 31 of cell 30 and an inner surface 13 of housing 12, which may be defined as gap 60. In other embodiments, gap 60 comprises the space between substantially opposing surfaces in interior chamber 14, in which separation membrane 16 is disposed. An aspect of the present invention is the control of the dimensions of gap 60, and particularly the spacing dimensions between outer surface 31 of cell 30 and separation membrane 16 (first spacing 66), as well as between inner surface 13 of housing 12 and separation membrane 16 (second spacing 68). Applicant has discovered that control of gap 60 and such separation spacing can dramatically improve degassing proficiency in a flow-through degassing module.

To assist in correctly positioning tubular separation membrane 16 in gap 60, one or more cell struts 62 may extend from outer surface 31 of cell 30 to support and/or maintain tubular separation membrane 16 in a spaced relationship from outer surface 31, and one or more housing struts 64 may extend from inner surface 13 of housing 12 to support and/or maintain at least a predetermined second spacing 68 between inner surface 13 and tubular separation membrane 16. The one or more cell struts may support tubular separation membrane 16 in spaced relationship from outer surface 31 of cell 30 to define first spacing 66, while housing struts 64 may act to maintain a spacing between inner surface 13 of housing 12 and separation membrane 16, as second spacing 68. In some embodiments, cell struts 62 are connected to cell 30 and extend from outer surface 31 by one or more dimensions that are substantially equivalent to first spacing 66. In some embodiments, housing struts 64 may be connected to housing 12, and extend from inner surface 13 by a dimension that is substantially equivalent to second spacing 68.

To enhance degassing efficiency, gas transport resistance should be reduced. In membrane vacuum degassing applications, transport resistance is primarily derived from the liquid phase and the membrane. To reduce the liquid phase transport resistance, gap 60 (the solvent depth) is reduced. However, a smaller gap 60 increases the flow resistance of the mobile phase through interior chamber 14, and may also cause difficulties in manufacturability. Thus, a balance is preferably struck among the efforts of reducing the size of gap 60, while maintaining sufficient first and second spacings 66, 68 to limit the corresponding increase in pressure drop in the mobile phase flow through interior chamber 14. Other configurational details may be employed to help reduce the liquid phase resistance, such as through local mixing in the liquid phase.

To calculate the pressure drop along interior chamber 14, we use the Darcy-Weisbach equation:

$$\Delta p = f_D \times \frac{L}{D} \times \frac{\rho V^2}{2}$$

Where $\Delta p$=pressure drop due to friction
L=length of interior chamber 14
D=hydraulic diameter of interior chamber 14
$\rho$=density of the fluid
V=mean velocity of the flow $F_D$=Darcy friction factor
Considering the annulus formation of the flow pattern $(D=D_1-D_2=2\,l)$ ($D_1$ is the larger cylinder ID, $D_2$ is the smaller cylinder OD, and l is the gap), the pressure drop is $$\Delta p = f_D \times \frac{L}{2l} \times \frac{\rho Q^2}{2\pi^2 (D_2+l)^2 l^2} \approx \frac{f_D \rho Q^2 L}{4\pi^2 (D_2)^2 l^3}$$

For laminar flow, which most of the flow is under, $$f_D = \frac{64}{Re} = \frac{32 v \pi D_2}{Q},$$

and the pressure drop becomes:

$$\Delta p \approx \frac{8\mu Q L}{\pi D_2 l^3}$$

The pressure drop is therefore inversely proportional to the third power of the gap 60. Applicant has determined that an appropriate dimension for gap 60 may be derived from first and second spacings 66, 68, as the radial spacing between separation membrane 16 and each of outer surface 31 of cell 30 and inner surface 13 of housing 12. First and second spacings 66, 68 may be controlled by respective height dimensions 63, 65 of cell and housing struts 62, 64. Applicant has determined that strut height 63 for cell struts 62 may be between 2-20 mils (5-500 micrometers). Likewise, strut height 65 for housing struts 64 may be between 2-20 mils (50-500 micrometers). While strut heights 63, 65 may not be precisely equal to respective first and second spacings 66, 68, the presence and dimensions of cell struts and housing struts 62, 64 provide for preferred radial dimensions for first and second spacings 66, 68 to achieve a balance between reduction in gas transport resistance, and an increase in pressure drop through interior chamber 14. First and second spacings 66, 68 therefore have a radial dimension of at least about 5 mils, and preferably between about 2-20 mils (50-500 micrometers).

It is to be understood that gap 60 may be defined as a channel or other flow region within which tubular separation membrane 16 is disposed in interior chamber 14. Specifically, gap 16 is not limited to being defined between outer surface 31 of cell 30 and inner surface 13 of housing 12. It is contemplated that other structures may be present within interior chamber 14 to define a flow channel for contacting tubular separation membrane 16 with the fluid.

Cell struts 62 and housing struts 64 are examples of various structure that is effective in maintaining first and second spacing 66, 68 between tubular separation membrane 16 and its radially adjacent structures. Such radial spacing provides fluid flow channels both radially inwardly and radially outwardly of tubular separation membrane 16. The existence of such flow channels acts to reduce the liquid phase transport resistance of gas to the separation membrane, and the calibrated spacing dimensions maximize such effect within useful pressure drop parameters.

Cell struts 62 and housing struts 64, in some embodiments, may form axially-aligned groups to define axially-oriented flow channels 70, 72, which applicant has determined to aid in mass transport properties of degassing module 10. That is, groups of cell struts 62 may be axially aligned with one another, and/or groups of housing struts 64 may be axially aligned with one another. Thus, cell struts 62 and housing struts 64 act both to define flow channels for the mobile phase through interior chamber 14, and to maintain desired first and second spacings 66, 68 radially from tubular separation membrane 16.

In some embodiments, tubular separation membrane 16 may be helically wound within interior chamber 14. In the embodiment illustrated in FIG. 1A, tubular separation membrane 16 extends continuously between first and second evacuation ports 40, 42 and is helically wound in an abutting configuration, wherein the wound tubing coil is in a side-by-side axially abutting relationship along length "L". Other winding patterns and arrangements for tubular separation membrane 16 are contemplated in the present invention, with example alternative arrangements being illustrated in other drawings in this case.

Figure 4:
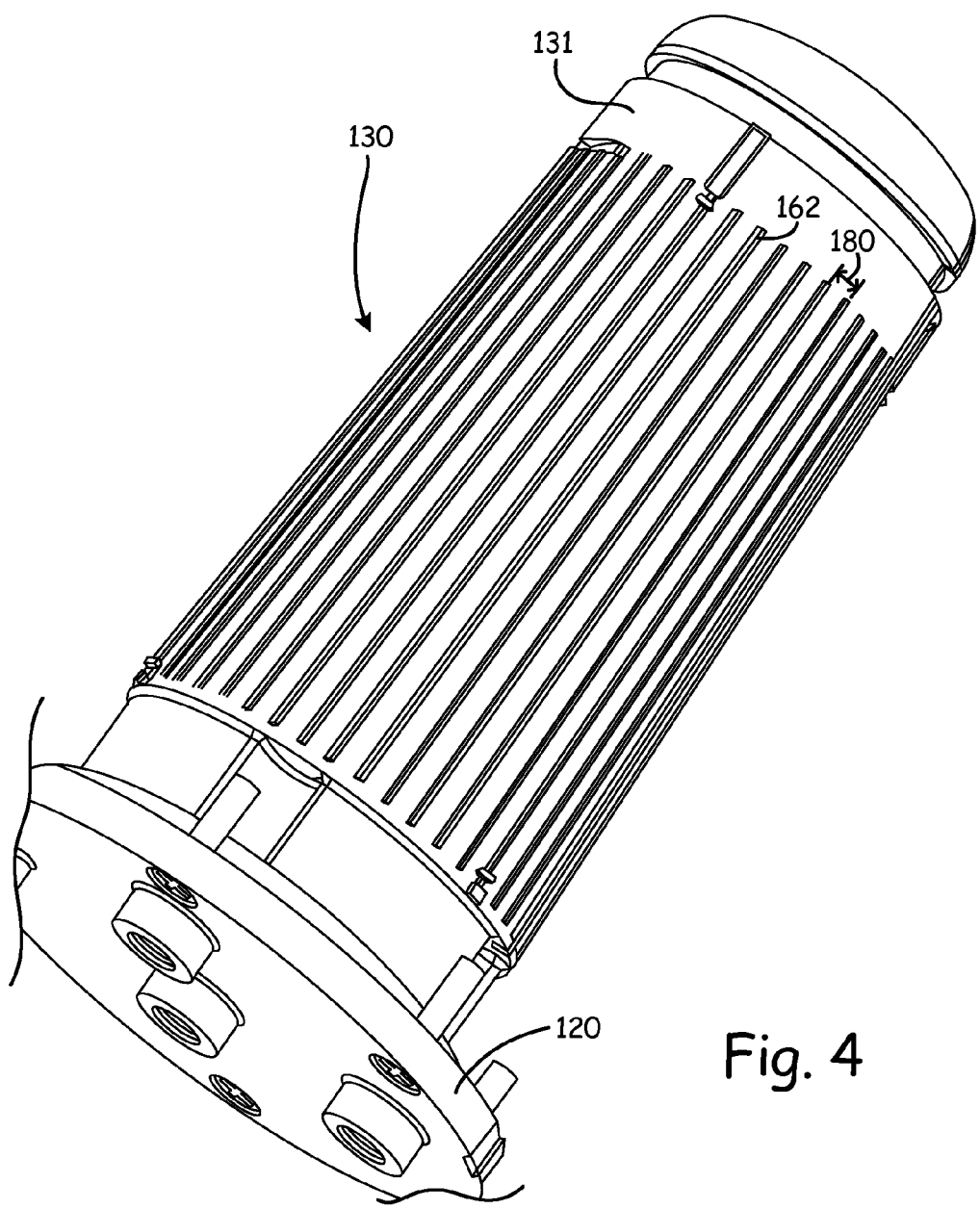
FIG. 4 is a schematic perspective view of a portion of the fluid degassing module of FIG. 2.

Another example embodiment is illustrated in FIGS. 2-7, wherein degassing module 110 includes a housing 112 having a housing shell 118 and a housing cap 120. In this embodiment, housing cap 120 includes first and second evacuation ports 140, 142 that are configured to receive coupling units 144, and a fluid inlet port and a fluid outlet port 150, 152 that are configured to receive fluid coupling units 154. Tubular separation membrane 116 is helically wound about cell 130, and particularly about cell struts 162 extending radially outwardly from cell 130. FIG. 4 is an isolation view of cell 130 extending axially from housing cap 120. Cell struts 162 extend substantially axially and substantially in parallel to each other about a circumference at outer surface 131 of cell 130. Applicant has determined that a plurality of cell struts 162 assist in maintaining a desired first spacing 166 of, for example, 50-500 micrometers. Accordingly, cell struts 162 may be circumferentially spaced apart by a circumferential spacing 180 that is proportional to first spacing 166, a circumference of cell 130, and the physical properties of separation membrane 116.

Figure 5:
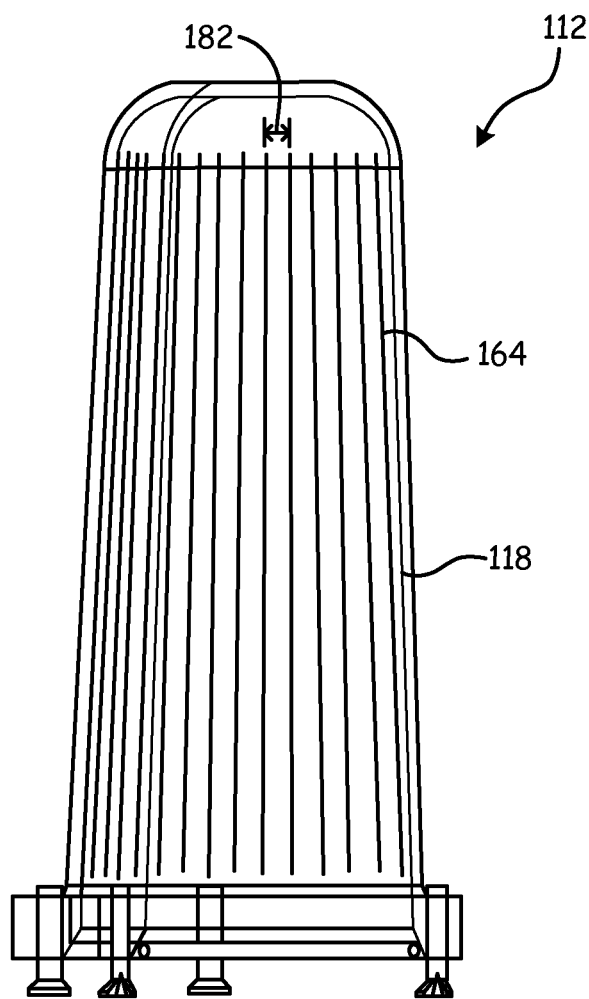
FIG. 5 is a schematic cross-sectional view of a portion of the fluid degassing module of FIG. 2.

FIG. 5 is a cross-sectional isolation view of housing 112, illustrating housing struts 164 extending radially inwardly from housing shell 118. Housing struts 164, in this embodiment, extend substantially in parallel, and substantially axially along housing shell 118 to provide for a second spacing 168 between tubular separation membrane 116 and housing shell 118. Similarly to cell struts 162, Applicant has determined that a plurality of housing struts 164 assist in maintaining a desired second spacing 168. The circumferential spacing 182 of housing struts 164 about housing shell 118 may be defined similarly to circumferential spacing 180 of cell struts 162.

Figure 6:
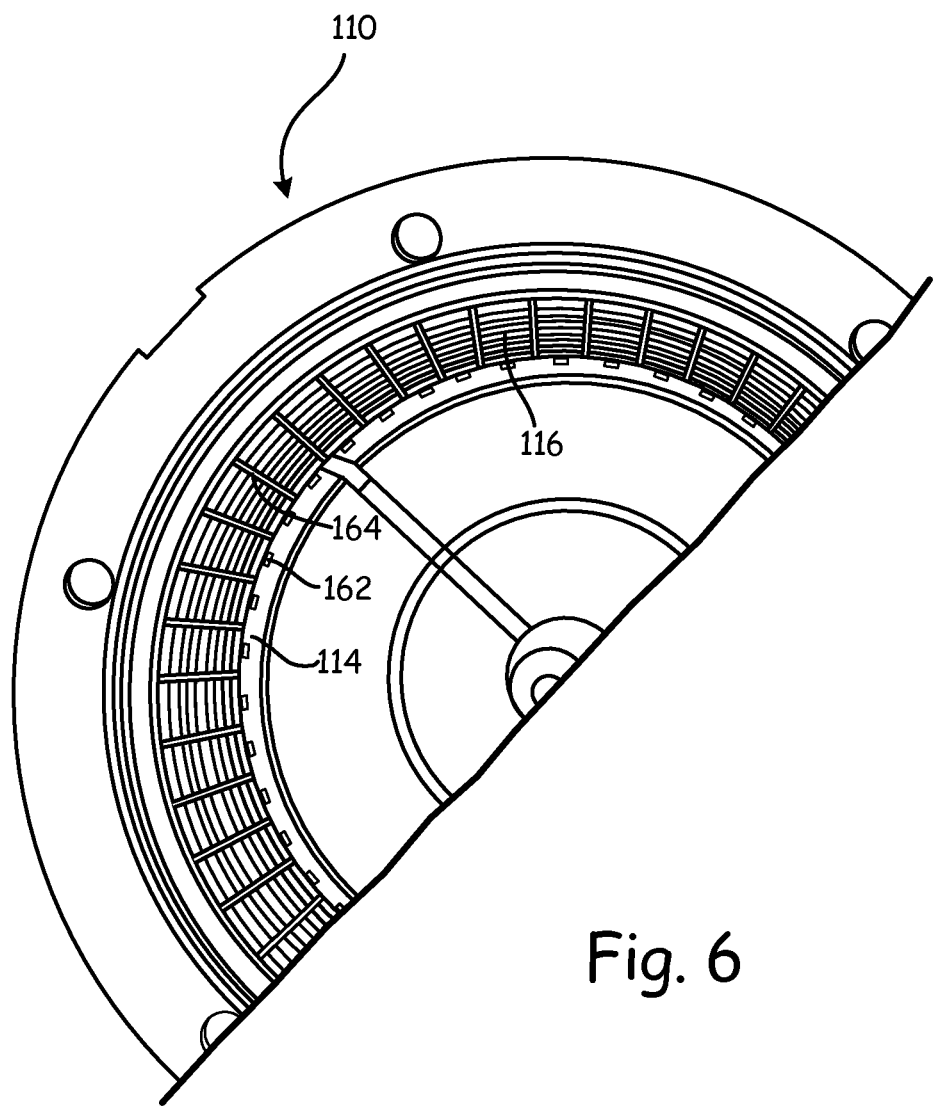
FIG. 6 is a schematic top cross-sectional view of a portion of the fluid degassing module of FIG. 2.
Figure 7:
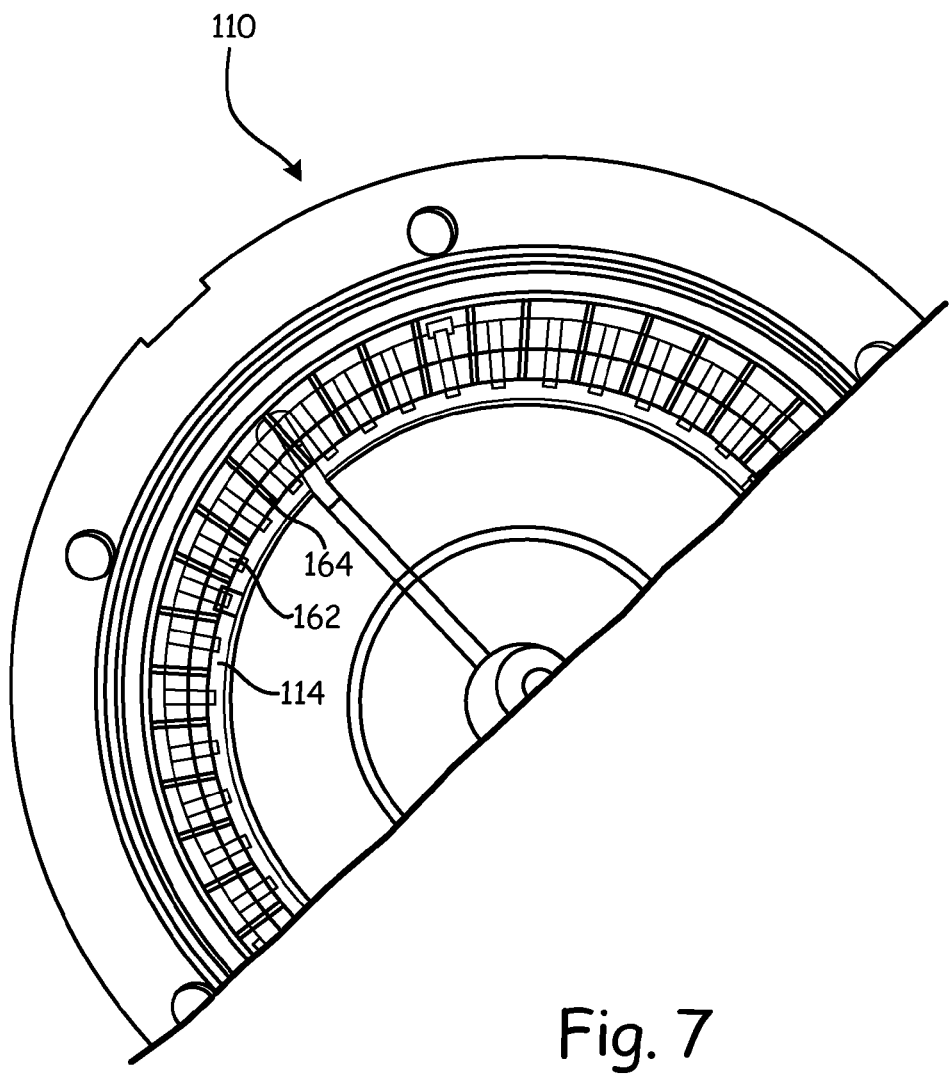
FIG. 7 is a schematic top cross-sectional view of a portion of the fluid degassing module of FIG. 2.
Figure 8:
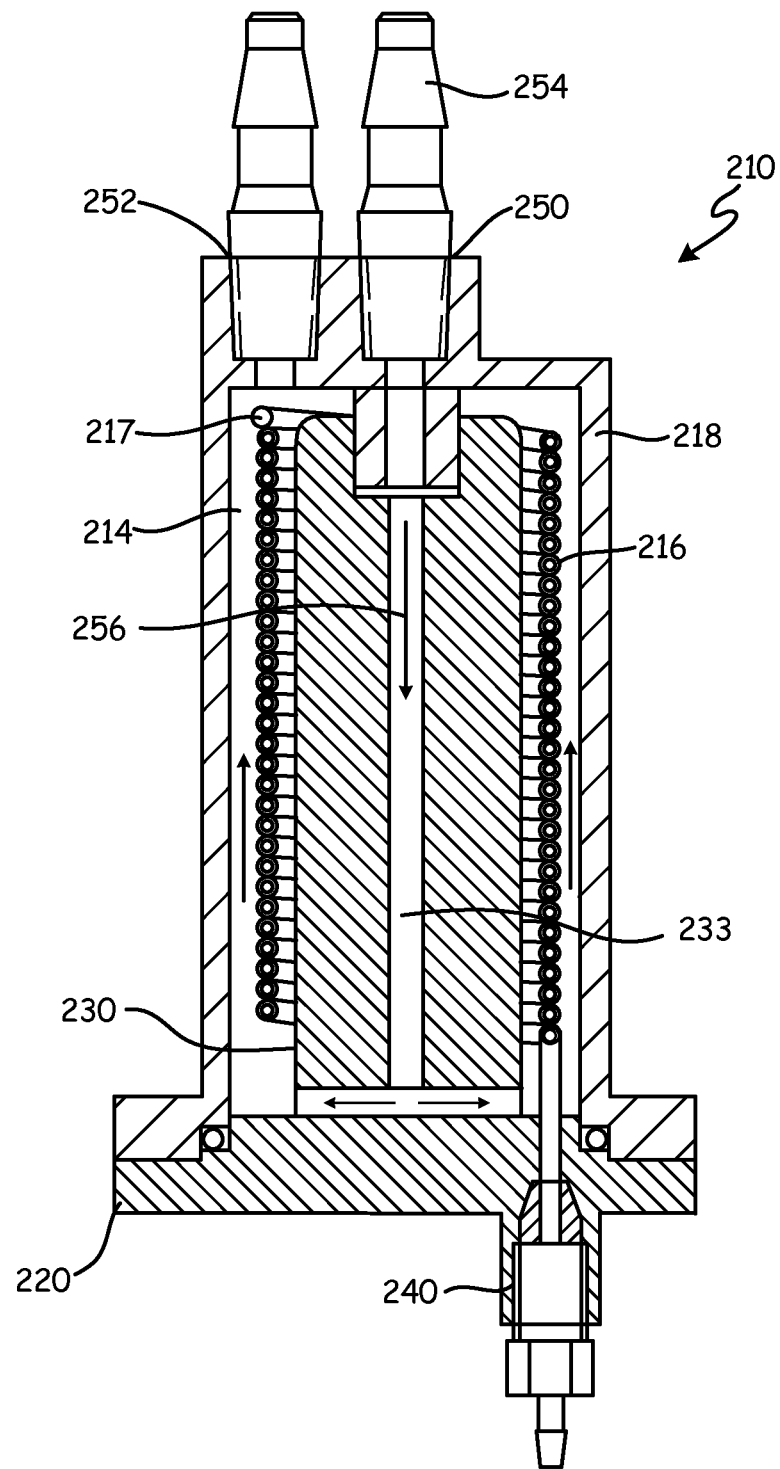
FIG. 8 is a cross-sectional schematic view of a portion of the fluid degassing module the present invention.

FIG. 6 illustrates a transparent end view of degassing module 110, with separation membrane 116 disposed in interior chamber 114 between cell struts 162 and housing struts 164. FIG. 7 represents a similar transparent view with the helically wound tubular separation membrane 118 being removed. The illustration of FIG. 7 reveals that, in some embodiments, housing struts 164 may be circumferentially offset from cell struts 162 to best retain separation membrane 116 at a position within gap 160 that properly maintains the desired first and second spacings 166, 168. Other arrangements and relative arrangements regarding cell struts 162 and housing struts 164, however, are contemplated as being useful in degassing modules of the present invention.

FIGS. 8-13 are cross-sectional schematic illustrations of alternative embodiments of degassing modules of the present invention. Degassing module 210 includes a fluid inlet port 250 and a fluid outlet port 252 in housing shell 218, and a first evacuation port 240 in housing cap 220. Fluid inlet port 250 permits conveyance of fluid through fluid coupling unit 254 along direction arrow 256 through cell channel 233 of cell 230, which distributes the fluid into interior chamber 214 for contact with helically wound tubular separation member 216. In this embodiment, a single separation membrane tube 216 may be helically wound about cell 230 and sealed at end 217, so that a lumen of tubular membrane 216 may be sufficiently evacuated by communication with a vacuum source through evacuation port 240.

Figure 9:
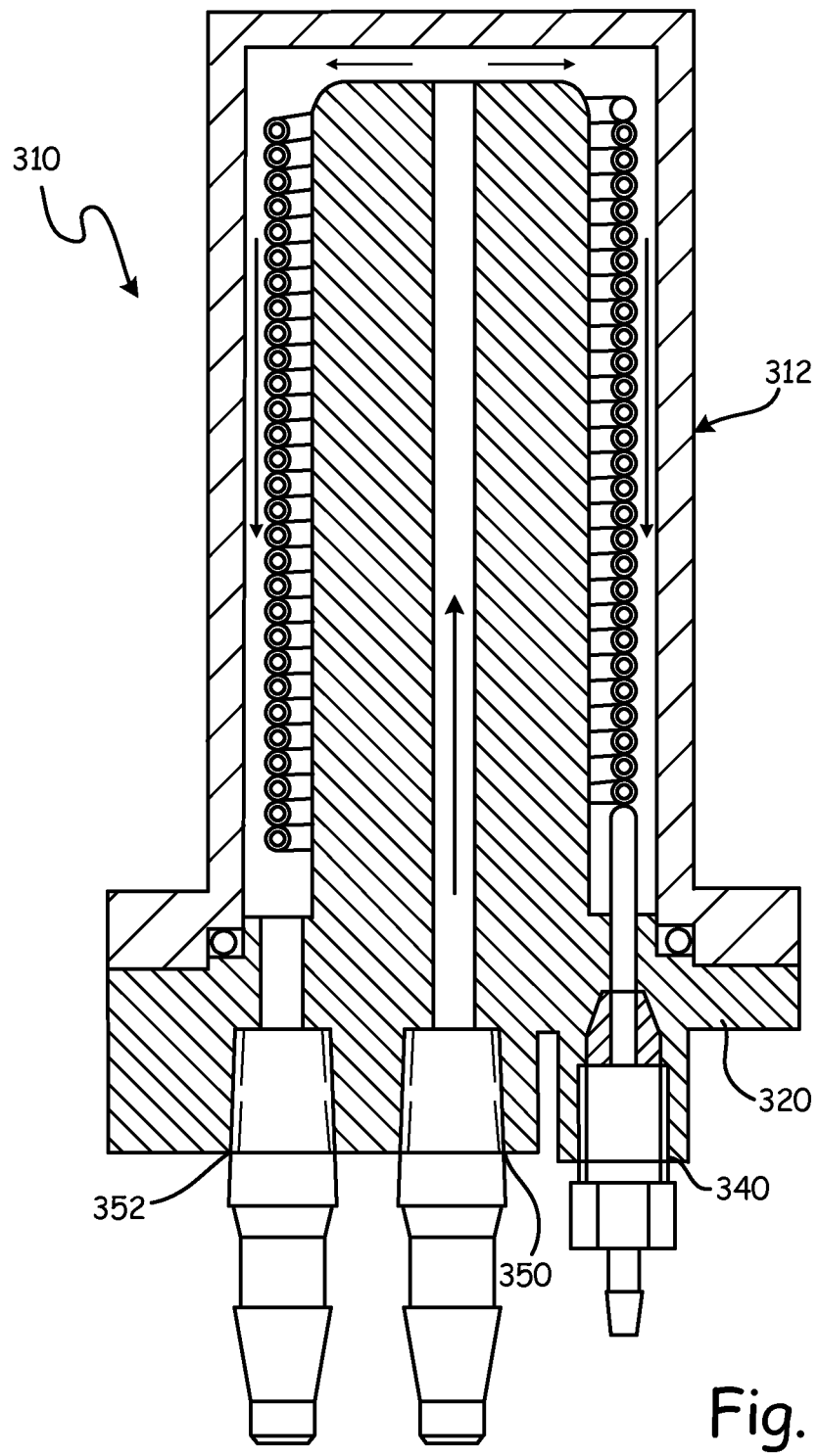
FIG. 9 is a cross-sectional schematic view of a portion of the fluid degassing module the present invention.

Degassing module 310, illustrated in FIG. 9, is similar to degassing module 210, but with fluid inlet port 350, fluid outlet port 352, and first evacuation port 340 each being disposed in housing cap 320 of housing 312.

Figure 10:
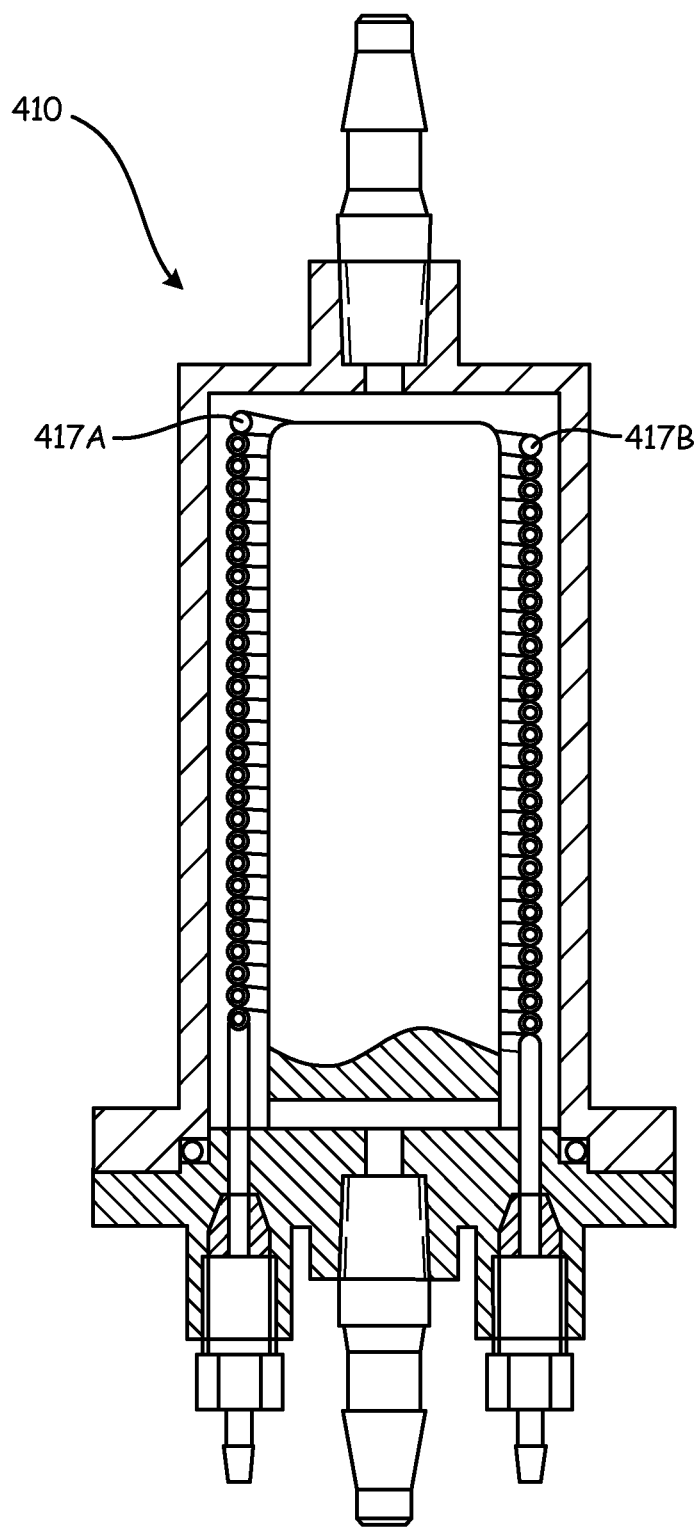
FIG. 10 is a cross-sectional schematic view of a portion of the fluid degassing module the present invention.

Degassing module 410 illustrated in FIG. 10 is similar to degassing module 10, with the exception of two distinct tubular separation membranes 416 being helically wound in axially abutting relationship with respective closed ends 417A, 417B.

Figure 11:
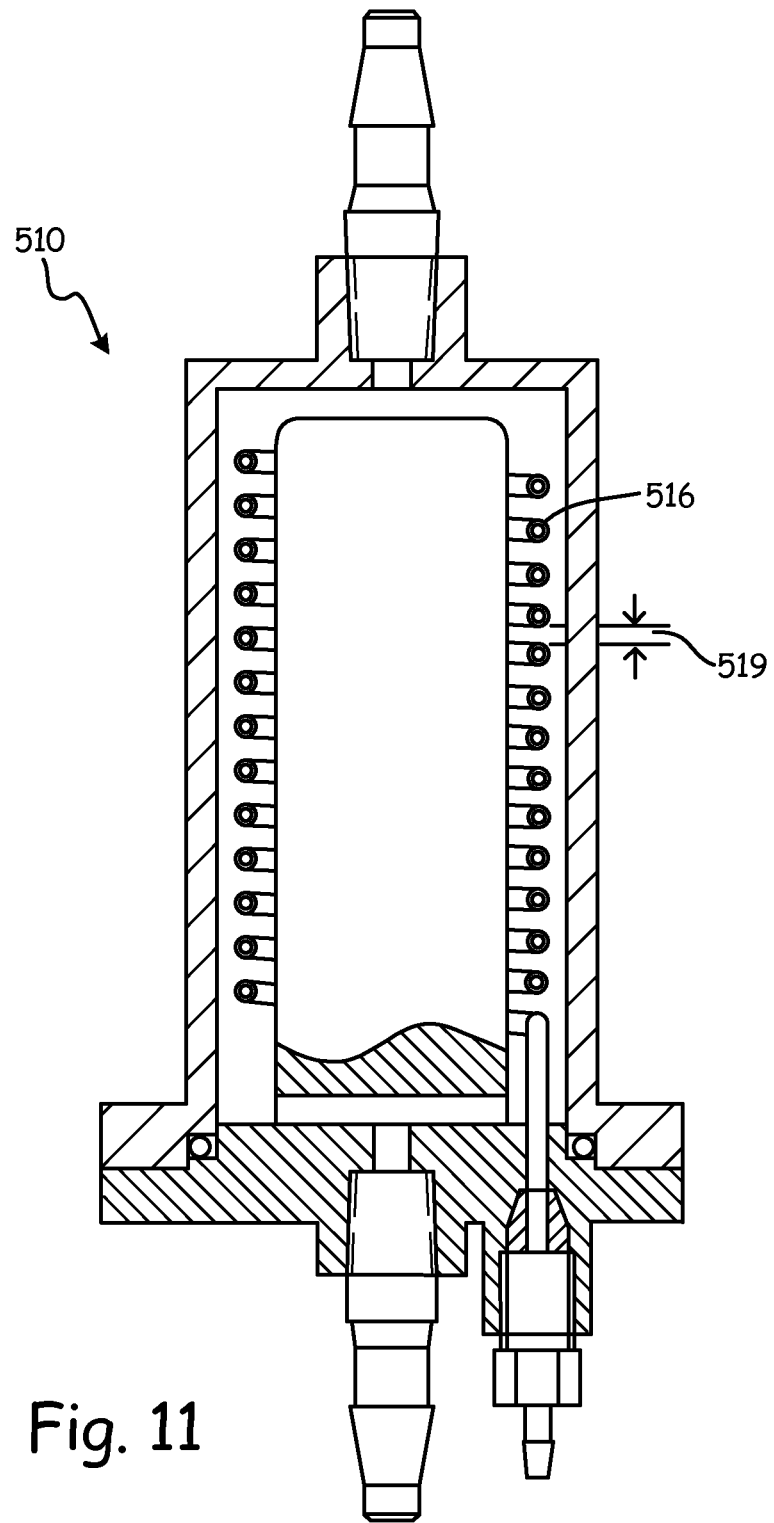
FIG. 11 is a cross-sectional schematic view of a portion of the fluid degassing module the present invention.

Degassing module 510, illustrated in FIG. 11, depicts an optional arrangement of tubular separation membrane 516 that is helically wound, but not in axially abutting relationship. Instead, at least some coils are axially spaced apart to provide an axial spacing 519 between adjacent coils. Applicant has determined that, in some embodiments, such axial spacing 519 may further reduce transport resistance of the gaseous species to the membrane. The reduction in transport resistance is likely due to increased membrane surface area available to be contacted, as well as the mixing effects upon the fluid flow that result from an axially spaced apart coiling pattern of tubular separation membrane 516.

Figure 12:
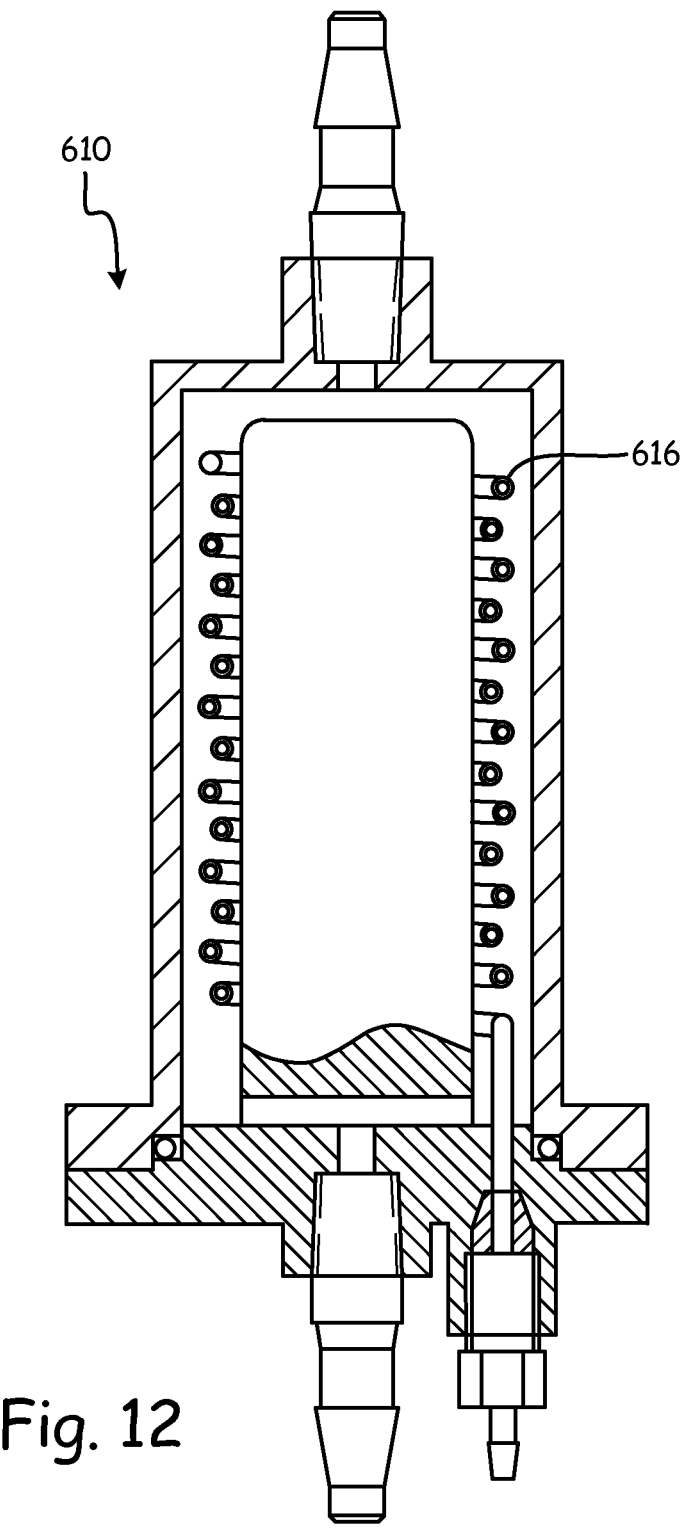
FIG. 12 is a cross-sectional schematic view of a portion of the fluid degassing module the present invention.

A further example separation membrane coiling pattern arrangement is illustrated in FIG. 12, wherein separation member 616 may have coils that are both axially spaced apart and radially displaced relative to an adjacent coil. Such an arrangement may further aid in the reduction of transport resistance of the gaseous species out of the liquid phase.

Figure 13:
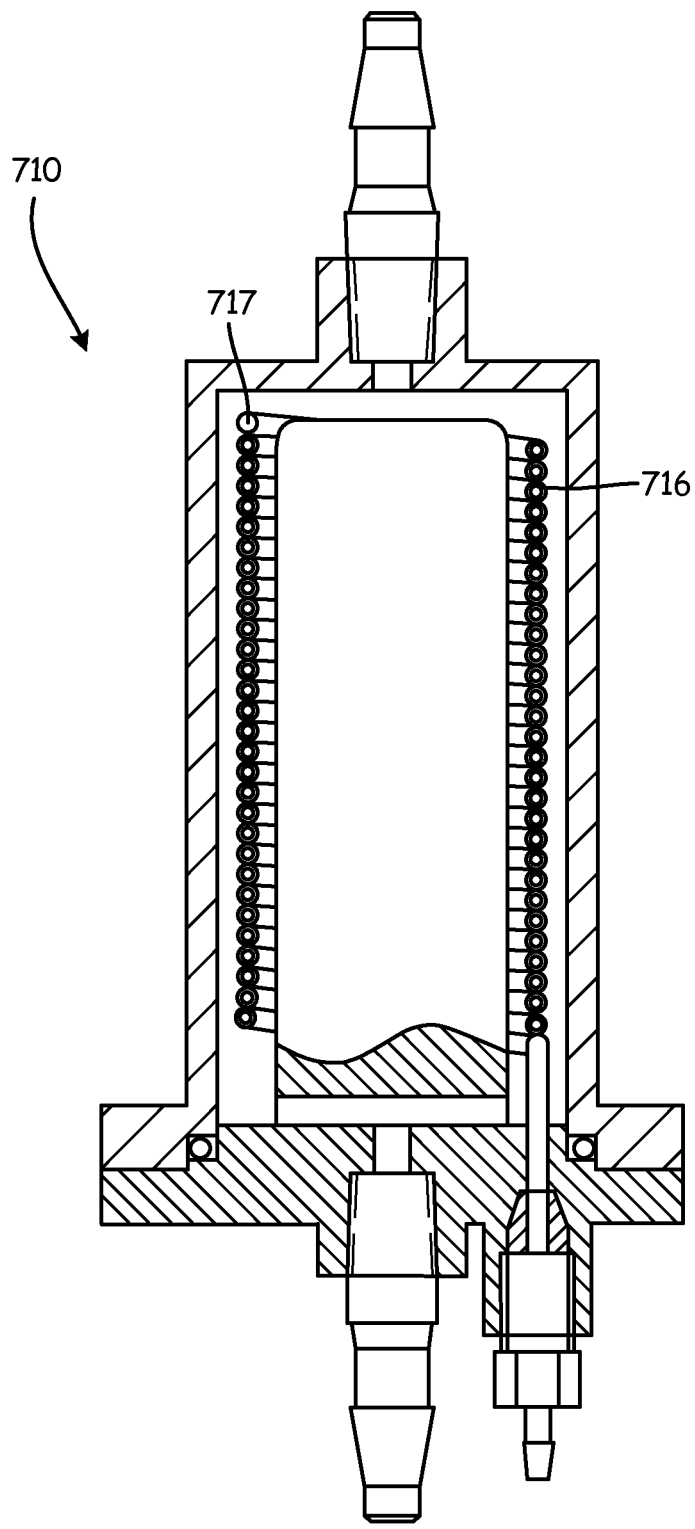
FIG. 13 is a cross-sectional schematic view of a portion of the fluid degassing module the present invention.

FIG. 13 illustrates a further alternative embodiment degassing module 710 with a single separation membrane tube 716 having a sealed end 717.

Figure 14:
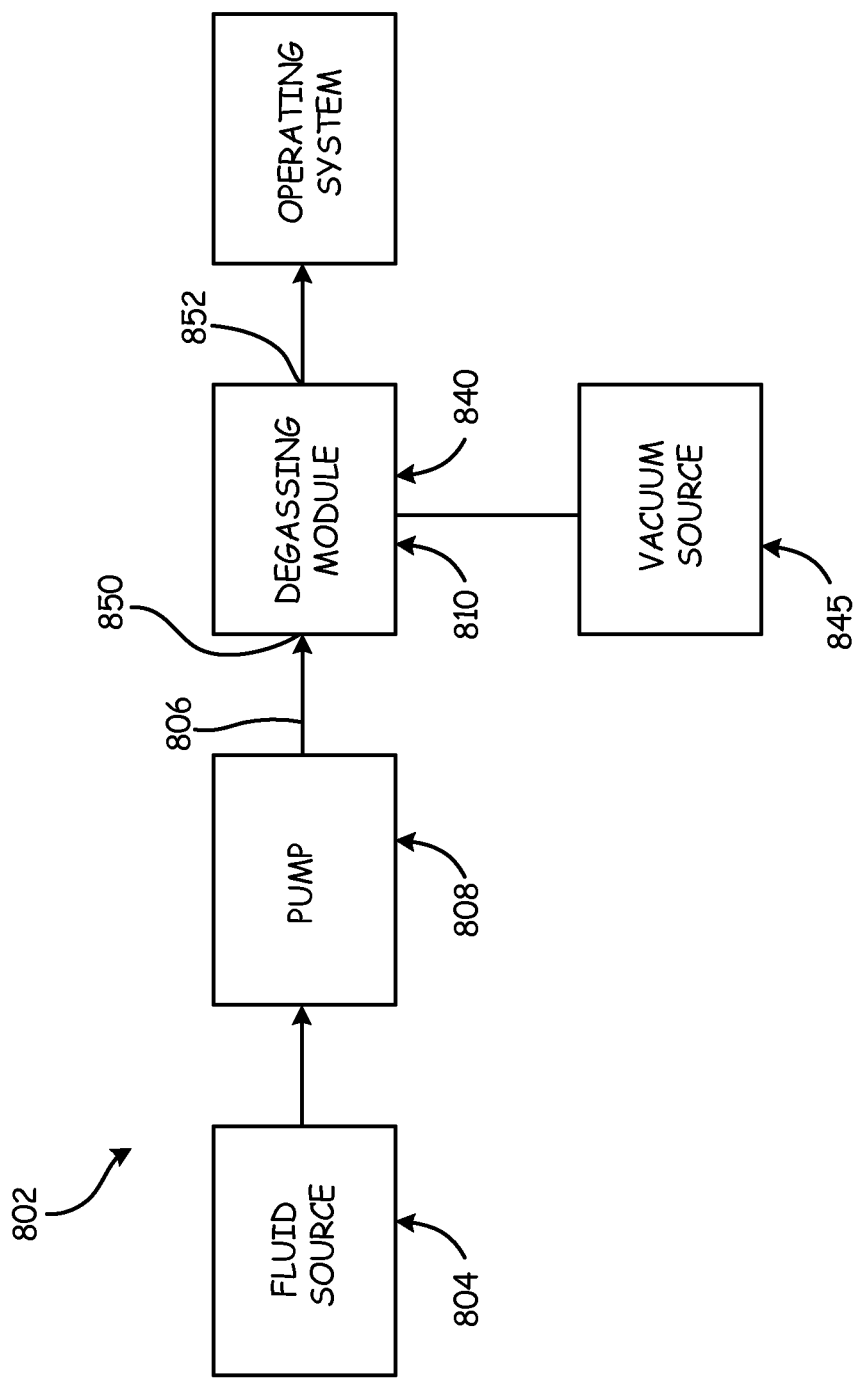
FIG. 14 is a schematic diagram of a fluid degassing system of the present invention.

An example degassing system 802 of the present invention is illustrated in FIG. 14, and includes a liquidous fluid source 804 and a degassing module 810. A pump 808 is provided for motivating liquidous fluid from liquidous fluid source 804 through a transfer conduit 806 that fluidically couples liquidous fluid source 804 to a fluid inlet 850 of degassing module 810. Pump 808 preferably motivates the liquidous fluid from liquidous fluid source 804 through an interior chamber of degassing module 810. Degassing system 802 preferably further includes a vacuum source 845 for evacuating a lumen of a tubular separation membrane within the interior chamber through an evacuation port 840 in degassing module 810. Degassed liquidous fluid flows out from degassing module 810 through a fluid outlet port 852 to an operating system, such as a chromatographic column, a liquid analyzer, an ink delivery mechanism, or the like. The liquidous fluid is preferably pumped into contact with the tubular membrane within degassing module 810 at a flow rate exceeding 20 ml/minute.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

What is claimed is:

1. A degassing module for degassing a liquidous fluid, said degassing module comprising:
    a housing defining an interior chamber and a housing axis, said housing having an evacuation port opening to said chamber, and a fluid inlet port and a fluid outlet port each opening to said chamber for permitting flow of the fluid through said interior chamber;
    a cell secured to said housing and having a length extending axially along said housing axis in said interior chamber;
    a tubular separation membrane helically wound about said cell in a gap between an inner surface of said housing and an outer surface of said cell, said membrane defining a lumen that is in fluid communication with said evacuation port for evacuating said lumen, said membrane forming a gas-permeable, liquid-impermeable barrier between said interior chamber and said lumen;
    a housing strut extending from said inner surface of said housing to maintain said membrane in a spaced relationship from said inner surface of said housing, with a first spacing being defined radially between said membrane and said inner surface of said housing; and
    a cell strut extending from said outer surface of said cell to maintain said membrane in a spaced relationship from said outer surface of said cell, with a second spacing being defined radially between said membrane and said outer surface of said cell.

2. A degassing module as in claim 1 wherein said housing includes a housing cap sealingly engaged to a housing shell.

3. A degassing module as in claim 2 wherein said cell extends from said housing cap.

4. A degassing module as in claim 1 wherein said first and second spacings are between 50-500 micrometers.

5. A degassing module as in claim 1, including a plurality of cell struts extending substantially axially along said outer surface of said cell to define axially-oriented flow channels between respective adjacent sets of cell struts and between said membrane and said outer surface of said cell.

6. A degassing module as in claim 5, including a plurality of housing struts extending substantially axially along said inner surface of said housing to define axially-oriented flow channels between respective adjacent sets of housing struts and between said membrane and said inner surface of said housing.

7. A degassing module as in claim 6 wherein said cell struts are circumferentially spaced apart by a circumferential spacing that is proportional to said first spacing and a circumference of said cell.

8. A degassing module as in claim 7 wherein said housing struts are circumferentially offset from said cell struts.

9. A degassing module for degassing a liquidous fluid, said degassing module comprising:
    a housing defining an interior chamber and a housing axis, and having an evacuation port, a fluid inlet port, and a fluid outlet port;
    a cell secured in said interior chamber and extending axially along said housing axis to form a circumaxial gap in said interior chamber, wherein the circumferential gap is radially bounded by a first surface and a second surface, with the second surface being substantially parallel to said first surface; and
    a tubular separation membrane defining a lumen that is in fluid communication with said evacuation port for evacuating said lumen, said membrane forming a gas-penneable, liquid-impermeable barrier between said interior chamber and said lumen, said membrane being helically wound about said cell in said circumaxial gap, with one or more spacing structures maintaining a first spacing between said membrane and said first surface, and a second spacing between said membrane and said second surface, wherein said first and second spacings are between 50-500 micrometers.

10. A degassing module as in claim 9 wherein said housing includes a housing cap sealingly engaged to a housing shell, and said cell extends axially from said housing cap.

11. A degassing module as in claim 10 wherein said cell and said housing cap form a unitary body.

12. A degassing module as in claim 11 wherein said fluid inlet port is in fluid communication with said interior chamber through said cell.

13. A degassing module as in claim 12 wherein said cell includes a cell channel for conveying the liquidous fluid from said fluid inlet port to said interior chamber.

14. A degassing module as in claim 13 wherein said cell channel extends axially along said housing axis through a length of said cell.

15. A degassing module as in claim 9 wherein said first and second spacings are substantially equal.

16. A degassing system for degassing a liquidous fluid, said degassing system comprising:
    a liquidous fluid source;
    a degassing module including:
        a housing defining an interior chamber and a housing axis, and having an evacuation port, a fluid inlet port, and a fluid outlet port;
        a cell secured in said interior chamber and extending axially along said housing axis to form a circumaxial gap in said interior chamber, wherein the circumferential gap is radially bounded by said housing and said cell;

a tubular separation membrane defining a lumen that is in fluid communication with said evacuation port for evacuating said lumen, said membrane forming a gas-permeable, liquid-impermeable barrier between said interior chamber and said lumen, said membrane being helically wound about said cell in said circumaxial gap, with one or more spacing structures maintaining a first spacing between said membrane and an inner surface of said housing, and a second spacing between said membrane and an outer surface of said cell;

a transfer conduit fluidically coupling said liquidous fluid source to said fluid inlet;

a pump for motivating the liquidous fluid from said liquidous fluid source through said interior chamber of said degassing module; and a vacuum source for evacuating said lumen through said evacuation port.

17. A degassing system as in claim 16 wherein the liquidous fluid is pumped into contact with said tubular membrane.

18. A method for degassing a liquidous fluid, said method comprising:
(a) providing a degassing module having:
(i) a housing defining an interior chamber and a housing axis, and having an evacuation port, a fluid inlet port; and a fluid outlet port;
(ii) a cell secured in said interior chamber and extending axially along said housing axis to form a circumaxial gap in said interior chamber, wherein the circumferential gap is radially bounded by said housing and said cell; and
(iii) a tubular separation membrane defining a lumen that is in fluid communication with said evacuation port for evacuating said lumen, said membrane forming a gas-permeable, liquid-impermeable barrier between said interior chamber and said lumen, said membrane being helically wound about said cell in said circumaxial gap, wherein a first spacing is maintained between said membrane and said first surface, and a second spacing is maintained between said membrane and said second surface;
(b) motivating the liquidous fluid through said fluid inlet and into contact with said membrane in said interior chamber;
(c) evacuating said lumen through said evacuation port; and
(d) delivering the liquidous fluid from said interior chamber through said outlet port.

19. A method as in claim 18, including motivating the liquidous fluid through said degassing module at a flow rate exceeding 20 ml/minute.

20. A method as in claim 18 wherein said first and second spacings are between 50-500 micrometers.

* * * * *